(12) United States Patent
Swift et al.

(10) Patent No.: US 8,757,975 B2
(45) Date of Patent: Jun. 24, 2014

(54) PITCH CONTROL MECHANISM

(75) Inventors: Andrew Swift, Uttoxeter (GB); Antony Morgan, Wolverhampton (GB)

(73) Assignee: Rolls-Royce PLC, London (GB)

( * ) Notice: Subject to any disclaimer, the term of this patent is extended or adjusted under 35 U.S.C. 154(b) by 627 days.

(21) Appl. No.: 13/086,880

(22) Filed: Apr. 14, 2011

(65) Prior Publication Data

US 2011/0274544 A1    Nov. 10, 2011

(30) Foreign Application Priority Data

May 6, 2010    (GB) .................................. 1007565.3

(51) Int. Cl.
*B64C 11/38*    (2006.01)

(52) U.S. Cl.
USPC .......................................................... 416/147

(58) Field of Classification Search
CPC ........ B64C 11/30; B64C 11/38; B64C 11/40; B64C 11/42
USPC ...... 416/147, 155, 156, 157 R, 157 A, 157 B, 416/164
See application file for complete search history.

(56) References Cited

U.S. PATENT DOCUMENTS

| | | | |
|---|---|---|---|
| 2,850,106 A | 9/1958 | Swan | |
| 2,924,281 A | 2/1960 | Mergen et al. | |
| 2,980,188 A | 4/1961 | Allen et al. | |
| 3,004,608 A | 10/1961 | Pond | |
| 4,878,809 A | 11/1989 | Ames | |
| 5,042,966 A * | 8/1991 | Schwartz et al. ......... | 416/157 R |
| 5,152,668 A | 10/1992 | Bulman et al. | |
| 5,174,718 A | 12/1992 | Lampeter et al. | |
| 5,186,608 A | 2/1993 | Bagge | |
| 5,213,471 A | 5/1993 | Miller et al. | |
| 5,242,265 A | 9/1993 | Hora et al. | |
| 5,281,094 A | 1/1994 | McCarty et al. | |
| 5,282,719 A | 2/1994 | McCarty et al. | |
| 6,059,528 A | 5/2000 | Danielson et al. | |
| 2011/0164978 A1 | 7/2011 | Swift et al. | |

FOREIGN PATENT DOCUMENTS

| | | |
|---|---|---|
| EP | 1 881 176 A2 | 1/2008 |
| EP | 2 189 646 A2 | 5/2010 |
| GB | 1 041 353 | 1/1962 |
| GB | 1 384 383 | 8/1971 |

(Continued)

OTHER PUBLICATIONS

Great Britain Search Report issued in Application No. GB 1007564.6, dated Aug. 5, 2010.

(Continued)

*Primary Examiner* — Richard Edgar
(74) *Attorney, Agent, or Firm* — Oliff PLC

(57) ABSTRACT

A pitch control mechanism for controlling the pitch of propeller assembly propellers has a hydraulic actuator, main hydraulic fluid supply lines, first back-up hydraulic fluid supply lines, and second back-up hydraulic fluid supply lines. The hydraulic actuator has first and second hydraulic cylinders that each angularly displace the propellers between fine and coarse positions. The main hydraulic fluid supply lines supply fluid to the first and second hydraulic cylinders for operating the hydraulic cylinders. The first back-up hydraulic fluid supply lines supply fluid to the hydraulic cylinder for displacing the propellers to a coarser position. The second back-up hydraulic fluid supply lines supply fluid to the second hydraulic cylinder for displacing the propellers to a coarser position. When the main hydraulic fluid supply lines supply inadequate fluid, the first and/or second back-up hydraulic fluid supply lines can supply fluid for displacing the propellers to a coarser position.

14 Claims, 3 Drawing Sheets

(56) References Cited

FOREIGN PATENT DOCUMENTS

| | | |
|---|---|---|
| GB | 1 375 988 | 12/1971 |
| GB | 2 071 781 A | 3/1981 |
| GB | 2 236 810 A | 4/1991 |
| GB | 2 260 821 A | 4/1993 |
| GB | 2 347 974 A | 9/2000 |
| WO | WO 91/09774 | 7/1991 |
| WO | WO 91/09775 | 7/1991 |
| WO | WO 98/22340 | 5/1998 |
| WO | WO 99/20522 | 4/1999 |

OTHER PUBLICATIONS

Great Britain Search Report issued in Application No. GB 1007569.5, dated Aug. 31, 2010.

Great Britain Search Report issued in Application No. GB 0002681.5, dated Jul. 14, 2000.

Great Britain Search Report issued in Application No. GB 1007567.9, dated Aug. 19, 2010.

U.S. Appl. No. 13/086,795, filed Apr. 14, 2011, by Andrew Swift, et al.

U.S. Appl. No. 13/086,866, filed Apr. 14, 2011, by Antony Morgan.

U.S. Appl. No. 13/086,876, filed Apr. 14, 2011, by Antony Morgan.

Notice of Allowance issued in U.S. Appl. No. 13/086,795 mailed Feb. 11, 2014.

Notice of Allowance issued in U.S. Appl. No. 13/086,866 mailed Feb. 7, 2014.

Notice of Allowance issued in U.S. Appl. No. 13/086,876 mailed Feb. 10, 2014.

* cited by examiner

PITCH CONTROL MECHANISM

The present invention relates to a pitch control mechanism for controlling the pitch of propellers of a propeller assembly.

Aero propellers, either single rotor or contra-rotating, usually have a means of varying the blade pitch via a pitch control mechanism (PCM), to optimise efficiency of thrust delivery and to reduce noise throughout the flight envelope, to provide reverse thrust, and to be able to feather the blades to control drag and rotor speed in some powerplant failure cases. There are a number of established ways of configuring a PCM, but all feature a source of power, prime mover, mechanism from prime mover to blade, and a failsafe system. The power source can be in the static or rotating field, although it is more common for it to be in the static field to avoid static to rotating control communication issues and for easier line replacement of faulty components. However, where the power source is in the static field, a means of transferring the power to the rotating field(s) is required.

For a static electrical power source the transfer is typically achieved via slip rings. These are used on single propeller assembly turboprop engines. However, they suffer from a high maintenance burden. Further, on an engine having two contra-rotating propeller assemblies, and particularly such an engine where the exhaust is ducted under the propeller blade roots, the slip rings would experience very high operating speeds which would significantly reduce slip ring life. The high speeds result from a need to locate the rings at large radial distances in a non-oily zone, as well as from the high relative speeds caused by contra-rotation. Thus slip rings are not seen as a viable solution for power source transfer in contra-rotating propeller assemblies.

For a static hydraulic power source, the transfer can be achieved by rotating hydraulic couplings. For example, in a single rotor engine arrangement, the propeller assembly may be driven by a hollow propeller shaft. A rotating hydraulic coupling can be provided at one end of the propeller shaft, with hydraulic supply lines running inside the shaft from the coupling to a PCM prime mover (e.g. a hydraulic actuator) adjacent the propeller blades. The propeller shaft, supply lines and prime mover are all in the rotating field. A hydraulic pressure power source, which is in the static field, supplies hydraulic fluid to the coupling, and thence to the supply lines.

However, a fundamental design constraint on a rotating hydraulic coupling is that the product (PV) of static to rotating interface velocity (V) and hydraulic pressure (P) should be kept within limits to maintain seal life, assuming positive sealing is necessary. Since propeller rotational speed is generally predetermined, reducing the diameter of the rotating interface is thus of prime importance. Even in circumstances where some leakage is permissible from the rotating hydraulic coupling, reducing the rotating interface diameter helps to decrease the amount of that leakage.

Turboprop engines, whether having a single propeller assembly or two contra-rotating propeller assemblies, employ a reduction gearbox. As shown schematically in FIG. 1, such a gearbox 1 can be of a step-aside shaft configuration in which a drive shaft 2 extending from the free power turbine 3 of the engine 4 is laterally offset from the propeller shaft 5 of the propeller assembly 6. In this configuration, a small diameter, and hence low PV value and low leakage hydraulic coupling 7 may be located at the rear of the gearbox on the end of the propeller shaft, which is hollow. As described above, supply lines 8 can run along the inside of the propeller shaft to supply a hydraulic actuator 9, which rotates with the propeller assembly, with hydraulic fluid from a static hydraulic pressure power source 10.

Alternatively, as shown schematically in FIG. 2, the gearbox 1 can be of a coaxial epicyclic configuration, in which typically a sun gear of the gearbox is driven by and coaxial with the drive shaft 2 extending from the free power turbine 3 of the engine 4. However, as the axis of the propeller, gearbox and gas generator are coincident, it is more problematic to arrange for a small diameter hydraulic coupling 7 with an acceptably low PV value and low leakage rate because the static part of the coupling is outside the propeller shaft 5 outer diameter.

In the event of PCM failure, it may be desirable to move the blades to coarse to prevent dangerous increases in engine speed. In the event of engine failure, it may likewise be desirable to move the blades to coarse to reduce aircraft gliding resistance. However, the combined effect of rotational and aerodynamic forces acting on the blades tends to urge the blades to fine. Thus PCMs usually have a failsafe arrangement for preventing undesirable pitch variation in the event of power failure.

FIG. 3 shows schematically a longitudinal cross-section through a prior art PCM for varying the pitch of a row of propeller blades of a propeller assembly. The PCM comprises a hydraulic cylinder 11 and piston 12 which extend along the rotational axis X of the propeller blades 13 (only one of the propeller blades being shown in FIG. 3). The cylinder contains hydraulic fluid (e.g. oil), and a wall 14 fluidly seals the end of the cylinder. The piston divides the cylinder into two chambers 15, 16. By varying the fluid pressure difference between the two chambers, the piston can be moved to the left or the right along the axis X.

A quill 17 extends radially inwardly from the inboard end of each propeller blade 13 along the rotational axis Y of the blade, the quill connecting to an end of a crank arm 18 which has its other end in a respective retaining recess 19 formed at the end of the piston 12. By this mechanism, movement of the piston along the rotational axis X is converted into pitch-changing rotation of the blade about rotational axis Y.

The cylinder 11 is part of a larger housing which also provides a fixing arrangement 20 for the propeller blades 13 and a rotation drive input 21 for turning the propeller assembly. The drive input is typically connected to the output shaft of an engine gearbox. Hydraulic fluid for the chambers 15, 16 is provided by a fluid transmission tube 22 which extends axially from the drive input. A rotating fluid coupling 23 at the end of the tube allows fluid to be transmitted between the static and rotating fields.

A ball screw 24 (i.e. a screw with a plurality of balls located in the thread of the screw) extends along the rotational axis X, an end of the ball screw 24 being fixed by a hydraulically signalled brake 25 to the wall of the cylinder 11. A nut 26 which is axially and rotationally fixed relative to the piston 12 is threadingly engaged to balls of the ball screw. Lubricated in the hydraulic fluid, the balls provide a low friction threaded connection between the screw and the nut and offer little resistance to the axial movement of the piston in the cylinder whilst the pressurised de-activated brake allows the screw to rotate. However, in the event of fluid pressure loss, the brake activates and increases the frictional resistance to rotational movement of the screw, which restrains movement of the nut and piston and thereby prevents changes to the pitch of the propeller blades 13 in the fine direction.

PCMs, such as the one shown in FIG. 3, require the propeller assembly to have a central zone along its rotational axis for installation of the apparatus. Generally, such a zone is available on single propeller engines where the propeller assembly is mounted to one side of the engine's drive gearbox. However, other engine arrangements, and particularly in-line arrangements, may not have this zone available. For example, EP A 1881176 describes a contra-rotating propeller engine with a pair of propeller blade assemblies which rotate in opposite directions as a result of association with a coaxial epicyclic gear assembly acting as a differential gearbox. The propeller assemblies are in the "pusher" configuration, with the free power turbine drive shaft, static support structure for the propeller assembly rotors and the gearbox occupying central space on the axis of the forward propeller assembly, and thereby rendering a centrally-located ball screw style pitch lock apparatus impractical for at least the forward propeller assembly. Likewise, a centrally-located ball screw style pitch lock system would be impractical for the rear propeller assembly of a propeller engine with a pair of contra-rotating "puller" propeller blade assemblies driven by an in-line gear assembly.

The pitch of the propeller blades 13 is actively controlled by pitch control valves 27 which change the pressures in "to fine" fluid supply line 28 and "to coarse" fluid supply line 29 to vary the pressure within the chambers 15, 16 and thereby to cause pitch angle rotation. The pitch control valves 27 are supplied with hydraulic fluid by engine and gearbox mounted hardware such as a pump 30.

Fluid pressure loss within the chambers, which restrains movement of the nut 26 and piston 12 and thereby prevents changes to the pitch of the propeller blades 13 in the fine direction, follows from de-pressurisation of "pitch lock" line 31. This de-pressurisation may be due to system command to a special pitch lock control valve or through general loss of hydraulic system pressure.

The system also includes a separate back-up feather pump 32 which feeds hydraulic pressure into the primary system "to coarse" fluid supply line 29, thereby increasing blade angle which will reduce rotor speed and can reduce propeller drag at low angles.

The PCM is thus supported by two safety systems:
A pitch lock which holds the blade angle when completely de-energised, so that the rotor speeds and drags can be stabilised until the aircraft air speed, engine power or altitude changes.
A back-up feather system which allows the blade angle to be increased by means of a secondary source of hydraulic pressure, as long as the hydraulic integrity of the "to coarse" primary line from the control valves 27 through to the appropriate one of the chambers 15, 16 is intact.

This primary line typically includes: static external pipes, a rotating coupling, rotating pipes, an actuator cylinder, various static seals and piston head dynamic seals. Whilst high reliability of the line can be expected, a zero failure rate is difficult achieve. Further, for contra-rotating propeller systems, the "to coarse" primary line may be subject to a more complex route through the contra-rotating drive system, which potentially introduces more failure mode threats than single propeller systems which can make use of an offset gearbox.

Thus an object of the present invention is to provide a pitch control mechanism with back-up feathering capability which is less reliant on a "to coarse" primary line.

Accordingly, a first aspect of the present invention provides a pitch control mechanism for controlling the pitch of propellers of a propeller assembly, the pitch control mechanism having:
a hydraulic actuator which has first and second hydraulic cylinders, each hydraulic cylinder being operable to angularly displace the propellers of the propeller assembly between fine and coarse positions,
one or more main hydraulic fluid supply lines which are connected to the first and second hydraulic cylinders such that fluid supplied by the main hydraulic fluid supply lines operates the hydraulic cylinders,
one or more first back-up hydraulic fluid supply lines which are connected to the first hydraulic cylinder such that fluid supplied by the first back-up hydraulic fluid supply lines to the first hydraulic cylinder displaces the propellers to a coarser position, and
one or more second back-up hydraulic fluid supply lines which are connected to the second hydraulic cylinder such that fluid supplied by the second back-up hydraulic fluid supply lines to the second hydraulic cylinder displaces the propellers to a coarser position;
wherein, in the event of inadequate supply of fluid by the main hydraulic fluid supply lines, the first and/or the second back-up hydraulic fluid supply lines can supply fluid to the respective hydraulic cylinders to displace the propellers to a coarser position.

Thus, advantageously, the pitch control mechanism does not have to rely on a "to coarse" main supply line to provide back-up feathering. That is, the first and second back-up hydraulic fluid supply lines enable independent feathering, and can have sufficient physical separation from the primary feathering system to ensure no common mode failures between the primary and back-up feathering systems. In addition, the first and second hydraulic cylinders and the respective first and second back-up hydraulic fluid supply lines provide duplication of hydraulic operation so that failsafe reliability is increased.

The back-up featherer may have any one, or to the extent that they are compatible, any combination of the following optional features.

Typically, the main hydraulic fluid supply lines comprise one or more to-coarse lines which supply fluid to the hydraulic cylinders to displace the propellers to a coarser position. The to-coarse lines may have respective first check valves which close the to-coarse lines in the event of inadequate supply of fluid by the main hydraulic fluid supply lines. By closing the to-coarse lines, the check valves can thus provide pitch lock capability which prevents the propellers moving to fine. Typically, the main hydraulic fluid supply lines also comprise one or more to-fine lines which supply fluid to the hydraulic cylinders to displace the propellers to a finer position.

The first and second back-up hydraulic fluid supply lines may have respective second check valves which are operatively connected to the to-coarse lines such that the second check valves close the back-up hydraulic fluid supply lines when the supply of fluid by the main hydraulic fluid supply lines is adequate to operate the hydraulic cylinders. The second check valves can thus reduce or prevent unwanted leakage of fluid into the back-up hydraulic fluid supply lines.

Typically, the pitch change mechanism has a unison ring which is coaxial with the propeller assembly, the unison ring being movable by the hydraulic actuator to operate drive systems for angular displacement of respective propellers. Advantageously, the unison ring can be installed coaxially to the propeller assembly, but not in the central zone along its rotational axis. Thus the pitch change mechanism can be used to control the pitch of the forward propeller assembly of a propeller engine with a pair of contra-rotating "pusher" propeller blade assemblies driven by an in-line gear assembly, or the rear propeller assembly of a propeller engine with a pair of contra-rotating "puller" propeller blade assemblies driven by an in-line gear assembly. Each drive system operated on by the unison ring can conveniently comprise a lever arm or cam follower at the end of a quill shaft extending from the base of the respective propeller. Moving the unison ring thus turns the lever arm or cam follower to vary the pitch of the propeller.

A second aspect of the present invention provides an engine arrangement having:

a first propeller assembly, a pitch control mechanism according to the first aspect for controlling the pitch of propellers of the first propeller assembly, a primary hydraulic pressure power source, the main hydraulic fluid supply lines transferring hydraulic fluid between the primary hydraulic pressure power source and the hydraulic actuator, and a back-up hydraulic pressure power source, the first and second back-up hydraulic fluid supply lines transferring hydraulic fluid between the back-up hydraulic pressure power source and the hydraulic actuator. The pitch control mechanism may have any one, or to the extent that they are compatible, any combination of the optional features of the first aspect.

The engine arrangement may have any one, or to the extent that they are compatible, any combination of the following optional features.

The primary hydraulic pressure power source can also be the hydraulic pressure power source. Preferably, however, for enhanced independence of operation, the hydraulic pressure power source is separate from the primary hydraulic pressure power source. For example, different pumps can supply hydraulic fluid for the main hydraulic fluid supply lines and for the back-up hydraulic fluid supply lines.

Typically, the hydraulic actuator rotates with the first propeller assembly. Typically, the primary hydraulic pressure power source is located on a static structure of the engine arrangement.

The back-up hydraulic pressure power source is typically located on a static structure of the engine arrangement. When the hydraulic actuator rotates with the first propeller assembly, the engine arrangement may then have a back-up hydraulic rotating coupling, the first and second back-up hydraulic fluid supply lines transferring hydraulic fluid between the back-up hydraulic pressure power source and the hydraulic actuator over the back-up rotating coupling; wherein a static side of the back-up hydraulic rotating coupling is mounted to the static structure of the engine arrangement, and a rotating side of the back-up hydraulic rotating coupling rotates with the propeller assembly. This arrangement can further help to isolate the back-up feather from the primary featherer.

Preferably, the back-up hydraulic rotating coupling has a non-contacting interface across which hydraulic fluid is transmitted between its static and rotating sides. Such an arrangement allows the back-up hydraulic rotating coupling to tolerate a high PV because the static and rotating sides do not contact across the interface. As the back-up hydraulic fluid supply lines are not used in normal operation, leakage from the coupling can be tolerated.

Preferably, the static side of the back-up hydraulic rotating coupling is mounted to a portion of the static structure which supports the propeller assembly. The back-up hydraulic rotating coupling can thus be relatively close to the propellers on which the hydraulic actuator operates, reducing the distance over which the back-up hydraulic fluid supply lines must extend to transfer fluid to the actuator.

The engine arrangement typically further has:

a gear assembly that drives the first propeller assembly, the gear assembly being driven by a power drive shaft that joins to the gear assembly at a first side thereof, the power drive shaft having a longitudinally extending internal cavity, a static conduit which extends along the internal cavity, the conduit penetrating the gear assembly such that a portion of the conduit projects from an opposing second side of the gear assembly, the main hydraulic fluid supply lines being routed inside the static conduit, and a first main hydraulic rotating coupling mounted to the projecting portion of the static conduit, the main hydraulic fluid supply lines extending between the primary hydraulic pressure power source (located on a static structure of the engine arrangement) and the hydraulic actuator via the first main hydraulic rotating coupling. Advantageously, as the static conduit extends along the internal cavity of the power drive shaft, the first main hydraulic rotating coupling mounted to the projecting portion of the static conduit can have a relatively small diameter and thus can provide a low PV value and low leakage rate.

Preferably, the back-up hydraulic rotating coupling is on the first side of the gear assembly. The back-up hydraulic rotating coupling can thus be radially outward of the power drive shaft.

The arrangement can be used for engines having a single propeller assembly. However, preferably the engine arrangement is for a contra-rotating engine. For example, the engine arrangement may further have:

a second propeller assembly arranged to rotate in an opposite direction to the first propeller assembly, the gear assembly also driving the second propeller assembly, a second pitch change mechanism having a hydraulic actuator which rotates with the second propeller assembly and which angularly displaces propellers of the second propeller assembly, one or more second main hydraulic fluid supply lines for transferring hydraulic fluid between the primary hydraulic pressure power source and the hydraulic actuator of the second pitch change mechanism, the second main hydraulic fluid supply lines being routed inside the static conduit, and a second main hydraulic rotating coupling which is mounted to the projecting portion of the static conduit, the second main hydraulic fluid supply lines extending between the primary hydraulic pressure power source and the hydraulic actuator of the second pitch change mechanism via the second main hydraulic rotating coupling.

Typically, the gear assembly is an epicyclic gear assembly having e.g. a sun gear, and planetary gears driven by the sun gear and in turn driving a carrier. For example, the power drive shaft can drive the sun gear, and the carrier can drive the first propeller assembly. The epicyclic gear assembly may further have a ring gear driven by the planetary gears. In the context of a contra-rotating engine, the ring gear can drive the second propeller assembly.

Conveniently, the static conduit may penetrate an epicyclic gear assembly through the sun gear, which can help to avoid or reduce detrimental effects on gear assembly stiffness. Further, even if the gear assembly malfunctions, the ability of the fluid supply lines to transfer hydraulic fluid along the static conduit is unlikely to be compromised.

The first propeller assembly and the hydraulic actuator of the first pitch control mechanism may be located at the first side of the gear assembly, the main hydraulic fluid supply lines for the actuator being re-routed through the gear assembly between the first main hydraulic rotating coupling and the hydraulic actuator of the first pitch control mechanism. Such an arrangement may be adopted, for example, in relation to a contra-rotating engine. Thus when the gear assembly is an epicyclic gear assembly and the first propeller assembly is driven by a carrier of the gear assembly, the main hydraulic fluid supply lines for the hydraulic actuator of the first pitch control mechanism may be re-routed through the planetary gears and carrier of the gear assembly. In such an arrangement, the main hydraulic fluid supply lines may penetrate one or more of the planetary gears and/or pass between at least some of the planetary gears.

In the context of an engine arrangement for a contra-rotating engine, the second propeller assembly and the hydraulic actuator of the second pitch change mechanism are preferably located at the second side of the gear assembly.

Embodiments of the invention will now be described by way of example with reference to the accompanying drawings in which.

Figure 1:
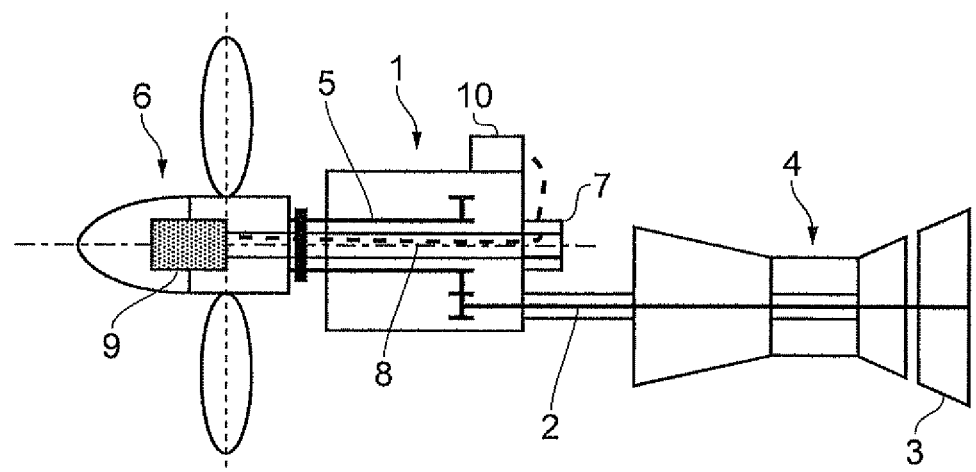
FIG. 1 shows a schematic longitudinal cross-section through a single propeller turboprop engine with a step-aside shaft configuration.
Figure 2:
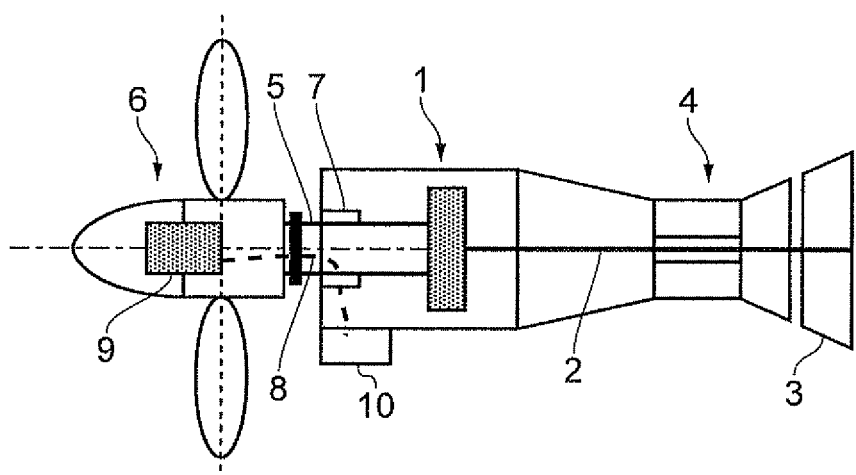
FIG. 2 shows a schematic longitudinal cross-section through a single propeller turboprop engine with an in-line shaft configuration.
Figure 3:
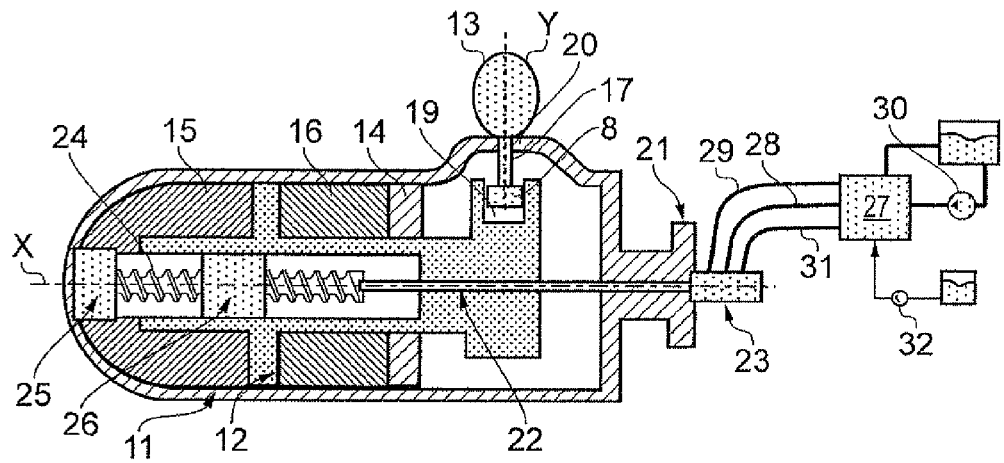
FIG. 3 shows schematically a longitudinal cross-section through a prior art screw pitch lock apparatus for varying the pitch of a row of propeller blades of a propeller assembly.
Figure 4:
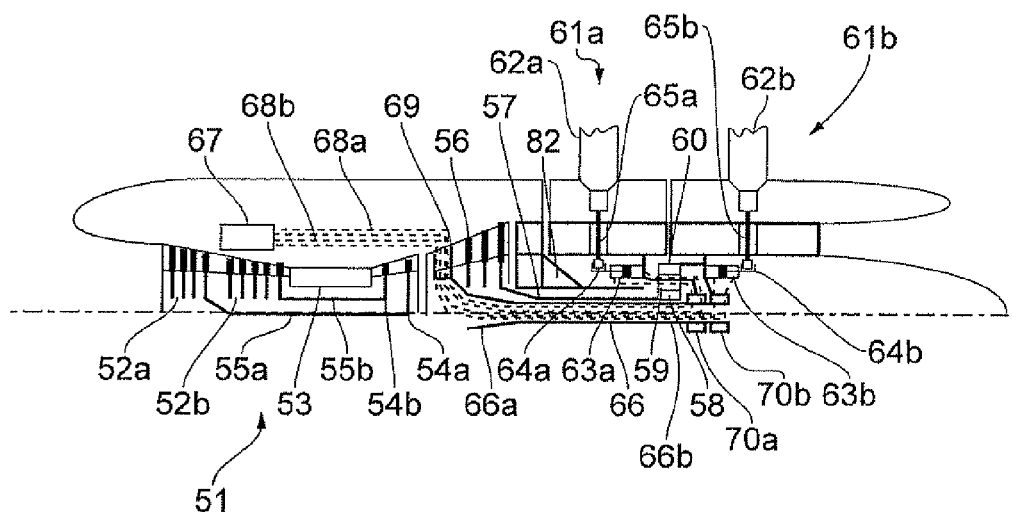
Figure 5:
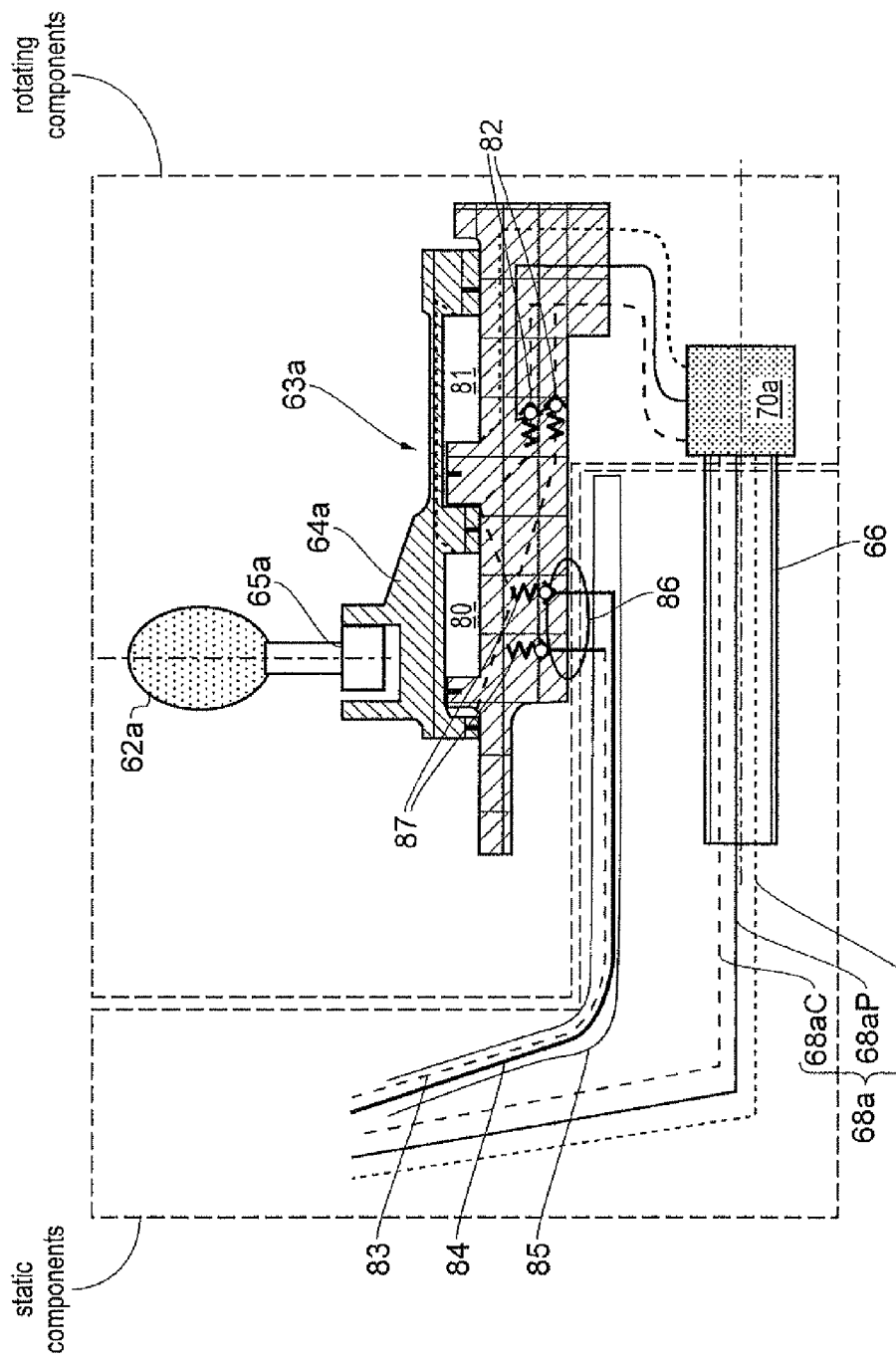

FIG. 4 shows a schematic longitudinal cross-section through a pusher style, contra-rotating propeller, turboprop engine with an in-line shaft configuration; and FIG. 5 shows schematically a pitch control mechanism used with the first propeller assembly of the engine of FIG. 4, A schematic longitudinal cross-section through a pusher style, contra-rotating propeller, turboprop engine is shown in FIG. 4. The engine has a generator section 51 comprising in flow series low pressure 52a and high pressure 52b compressor subsections, a combustor subsection 53, and high pressure 54b and low pressure 54a turbine subsections. Generator drive shafts 55a, 55b connect the respective compressor and turbine subsections. Downstream of the generator section is a free power turbine 56 which drives a rearwardly extending power drive shaft 57.

The distal end of the power drive shaft 57 drives a sun gear 58 of an epicyclic gear assembly which is coaxial with the power drive shaft. The sun gear drives planetary gears 59, which in turn drive a carrier (not shown) and a ring gear 60. The carrier and ring gear rotate in opposite directions. The carrier drives a first propeller assembly 61a on the upstream side of the gear assembly, while the ring gear drives a contra-rotating second propeller assembly 61b on the downstream side of the gear assembly. Each propeller assembly has a row of propeller blades 62a, 62b, with each blade being rotatable about its longitudinal axis to vary the blade pitch. The pitch variation for each propeller assembly is achieved by a respective pitch control mechanism, each comprising a hydraulic actuator 63a, 63b which moves a corresponding unison ring 64a, 64b in the axial direction of the engine. The axial movement of the unison rings rotates the blades via a quill shaft and lever or cam follower arrangement 65a, 65b which extends from the base of each blade.

The power drive shaft 57 is hollow and a static conduit or central oil tube (COT) 66 extends along the internal cavity formed by the shaft. One end of the COT opens to a mouth 66a at the gap formed between the forward end of the power drive shaft and the rearward end of the low pressure generator drive shaft 55a. The other end of the COT penetrates through the centre of the sun gear 58 to form a projection 66b on the downstream side of the gear assembly. A hydraulic pressure power source 67 (comprising e.g. a hydraulic pump, valves and control unit) for actuating the actuators 63a, 63b is attached to an accessory gearbox (not shown) of the engine remote from the actuators 63a, 63b. The hydraulic fluid is typically filtered engine oil.

To transfer hydraulic fluid between the power source 67 and the actuators 63a, 63b, respective main fluid supply lines 68a, 68b are routed from the source to the mouth 66a of the COT 66. The supply lines traverse the working gas annulus of the engine through a row of nozzle guide vanes 69 which are located between the generator section 51 and the free power turbine 156. This arrangement protects the supply lines from the high temperatures of the working gas. From the mouth of the COT, the supply lines are routed along the COT's internal cavity to arrive at the projection 66b on the downstream side of the gear assembly. A pair of axially spaced main hydraulic rotating couplings 70a, 70b are mounted to the projection, the upstream one associated with the hydraulic actuator 63a of the first propeller assembly 61a and the downstream one associated with the hydraulic actuator 63b of the second propeller assembly 61b. The internal sides of the couplings are formed by static fluid distributors while the external side of the upstream coupling 70a has a rotating sleeve that is driven by a drive bracket from the first propeller assembly 61a and the external side of the downstream coupling 70b has a rotating sleeve that is contra-driven by a drive bracket from the second propeller assembly 61b. Fluid is transmitted across upstream coupling 70a for those supply lines 68a which are routed to the hydraulic actuator 63a of the first propeller assembly, while fluid is transmitted across downstream coupling 70b for the remaining supply lines 68b which are routed to the hydraulic actuator 63b of the second propeller assembly.

The route taken by the supply lines 68b from the downstream coupling 30b to the hydraulic actuator 63b of the second propeller assembly 61b can be relatively direct. In contrast, the route taken by the supply lines 68a from the upstream coupling 70a to the hydraulic actuator 63a of the first propeller assembly 61a is more complicated as it passes through the gear assembly. Conveniently, the supply lines 68a are routed through the planetary gears 59 and carrier, which rotate with the first propeller assembly.

The engine arrangement overcomes problems with conventional propeller PCMs, particularly when applied to a pusher style contra-rotating open rotor with an in-line differential power gearbox. In particular, the arrangement of the COT 66 and the main hydraulic rotating couplings 70a, 70b mounted to the COT projection 66b allows small diameter couplings to be used and hence low PV values and low leakage rates can be achieved. Further the stiffness of the gear assembly is not substantially compromised by the COT extending through the sun gear 58. Also the potential for axial jamming of the transfer rods (used in EP A 1881176) and a consequent inability to feather the propeller blades to control drag and rotor speed is avoided.

The COT can also be used to route other power lines or control lines through the engine, these lines being e.g. hydraulic or electrical.

FIG. 5 shows schematically a more detailed view of the pitch control mechanism used with the first propeller assembly 61a of the engine of FIG. 4. Features common to FIGS. 4 and 5 share the same reference numbers. The dashed outlines divide components between those that are statically mounted and those that rotate with the first propeller assembly.

The hydraulic actuator 63a of the pitch control mechanism comprises fore 80 and aft 81 in-line hydraulic cylinders which are operable to move the unison ring 64a in either a forward or rearward axial direction. Moving the unison ring in the forward direction (i.e. to the left in FIG. 5) rotates the blades 62a via the respective quill shaft and lever or cam follower arrangements 65a to a "coarser" pitch, while moving the unison ring in the rearward direction (i.e. to the right in FIG.

5) rotates the blades 62a to a "finer" pitch. The fore and aft hydraulic cylinders 80, 81 provide redundancy, in the sense that only one of the cylinders is actually needed to move the unison ring 64a.

The main hydraulic fluid supply lines 68a extend between the hydraulic power source 67 and hydraulic cylinders 80, 81 via the COT 66 and over the main hydraulic rotating coupling 70a. These lines comprise a "to fine" line 68aF, a "to coarse" line 68aC and a pitch lock pressure line 68aP. The "to coarse" line extends to the aft hydraulic cylinder and then in series to the fore hydraulic cylinder. In contrast, the "to coarse" line splits at the hydraulic actuator 63a, with one branch extending to the fore hydraulic cylinder and the other branch extending in parallel to the aft hydraulic cylinder. Each branch has a respective check valve 82 which is controlled by the pressure of fluid in the pitch lock pressure line. In the event of failure in the hydraulic power source 67 or in the main hydraulic fluid supply lines 68a, the pressure in the pitch lock pressure line decreases which causes the check valves 82 to close. The rotational and aerodynamic forces acting on the blades 62a tend to urge the blades to fine, but shutting the "to coarse" line at the check valves has the effect of retaining fluid in the hydraulic cylinders which prevents movement of the unison ring in the rearward direction and hence prevents rotation of the blades to fine. Thus the pitch lock pressure line and check valves provide a first failsafe arrangement.

In the event of failure of the hydraulic power source 67 and/or the main hydraulic fluid supply lines 68a, it may also be desirable to move the blades to coarse. Thus the pitch control mechanism has a second failsafe arrangement in which a first back-up "to coarse" hydraulic fluid supply line 83 extends to the fore hydraulic cylinder 80, and a second back-up "to coarse" hydraulic fluid supply line 84 extends to the aft hydraulic cylinder 81. Preferably, the hydraulic fluid for the back-up supply lines is provided by a separate back-up hydraulic power source (not shown, but also comprising e.g. a hydraulic pump, valves and control unit) attached to the accessory gearbox of the engine. The first and second back-up fluid supply lines are routed along a pipe run 85 in a portion of the engine static structure between the power drive shaft 57 and the rotor for the first propeller assembly 61a, the static structure providing a mounting position for the bearings of the rotor. Additional check valves 87 controlled by the pressure of fluid in the two branches of the "to coarse" line 68aC prevent fluid entering the back-up fluid supply lines from the "to coarse" line when the primary pitch control system is operating normally.

A large diameter, back-up rotating coupling 86 allows the back-up fluid supply lines 83, 84 to cross from the static structure to the rotating frame of the first propeller assembly 61a. The coupling has a non-contacting (and therefore long life) interface between its static and rotating sides over which the hydraulic fluid is transmitted. Although the PV value of the back-up rotating coupling is relatively large, allowing leakage of fluid from the coupling, the amount of leakage is acceptable for back-up operations.

Thus, following disablement of the hydraulic power source 67 and/or the main hydraulic fluid supply lines 68a, and after the pitch lock pressure line and check valves 82 have prevented movement to fine, hydraulic fluid can still be supplied over either or both of the back-up fluid supply lines 83, 84 to the cylinders 80, 81. This moves the blades 62a further to coarse. Advantageously, the back-up fluid supply lines are independent of each other and extend to different cylinders, so that only one of the back-up fluid supply lines and its respective cylinder need to function correctly to move the blades. That is, complete duplication of hydraulic operation is provided, which increases the reliability of the second failsafe arrangement.

Thermal movement of the system can be controlled by over-feathering and the introduction of relief valves, using techniques known to the person skilled in the art.

The pitch control mechanism can provide:
A high integrity system offering pitch lock and back-up feathering which only slightly increases the overall PCM mass.
No requirement for drive signals to cross static-rotating interfaces.
A system which is independently testable and does not rely on the integrity of the main fluid supply lines.

While the invention has been described in conjunction with the exemplary embodiments described above, many equivalent modifications and variations will be apparent to those skilled in the art when given this disclosure. For example, although the hydraulic cylinders 80, 81 are shown coaxially in-line in FIG. 5, in other embodiments they may be side-by-side, or in other configurations known to the skilled person. Accordingly, the exemplary embodiments of the invention set forth above are considered to be illustrative and not limiting. Various changes to the described embodiments may be made without departing from the spirit and scope of the invention.

All references mentioned above are incorporated by reference.

The invention claimed is:

1. A pitch control mechanism for controlling the pitch of propellers of a propeller assembly, the pitch control mechanism having:
   a hydraulic actuator which has first and second hydraulic cylinders, each hydraulic cylinder being operable to angularly displace the propellers of the propeller assembly between fine and coarse positions,
   one or more main hydraulic fluid supply lines which are connected to the first and second hydraulic cylinders to supply fluid via the main hydraulic fluid supply lines to operate the hydraulic cylinders,
   one or more first back-up hydraulic fluid supply lines which are connected to the first hydraulic cylinder to supply fluid via the first back-up hydraulic fluid supply lines to the first hydraulic cylinder to displace the propellers to a coarser position, and
   one or more second back-up hydraulic fluid supply lines which are connected to the second hydraulic cylinder to supply fluid via the second back-up hydraulic fluid supply lines to the second hydraulic cylinder to displace the propellers to a coarser position;
   wherein, in the event of inadequate supply of fluid by the main hydraulic fluid supply lines, the first and/or the second back-up hydraulic fluid supply lines can supply fluid to the respective hydraulic cylinders to displace the propellers to a coarser position.

2. A pitch control mechanism according to claim 1, wherein the main hydraulic fluid supply lines comprise one or more to-coarse lines which supply fluid to the hydraulic cylinders to displace the propellers to a coarser position, the to-coarse lines having respective first check valves which close the to-coarse lines in the event of inadequate supply of fluid by the main hydraulic fluid supply lines.

3. A pitch control mechanism according to claim 2, wherein the first and second back-up hydraulic fluid supply lines have respective second check valves which are operatively connected to the to-coarse lines such that the second check valves close the back-up hydraulic fluid supply lines when the supply of fluid by the main hydraulic fluid supply lines is adequate to operate the hydraulic cylinders.

4. A pitch control mechanism according to claim 1 further having a unison ring which is coaxial with the propeller assembly, the unison ring being movable by the hydraulic actuator to operate drive systems for angular displacement of respective propellers.

5. An engine arrangement having:
a first propeller assembly,
a pitch control mechanism according to claim 1 for controlling the pitch of propellers of the first propeller assembly,
a primary hydraulic pressure power source, the main hydraulic fluid supply lines transferring hydraulic fluid between the primary hydraulic pressure power source and the hydraulic actuator, and
a back-up hydraulic pressure power source, the first and second back-up hydraulic fluid supply lines transferring hydraulic fluid between the back-up hydraulic pressure power source and the hydraulic actuator.

6. An engine arrangement according to claim 5, wherein the hydraulic actuator rotates with the first propeller assembly and the back-up hydraulic pressure power source is located on a static structure of the engine arrangement.

7. An engine arrangement according to claim 6, further having a back-up hydraulic rotating coupling, the first and second back-up hydraulic fluid supply lines transferring hydraulic fluid between the back-up hydraulic pressure power source and the hydraulic actuator over the back-up rotating coupling;
wherein a static side of the back-up hydraulic rotating coupling is mounted to the static structure of the engine arrangement, and a rotating side of the back-up hydraulic rotating coupling rotates with the propeller assembly.

8. An engine arrangement according to claim 7, wherein the back-up hydraulic rotating coupling has a non-contacting interface across which hydraulic fluid is transmitted between its static and rotating sides.

9. An engine arrangement according to claim 7, wherein the static side of the back-up hydraulic rotating coupling is mounted to a portion of the static structure which supports the propeller assembly.

10. An engine arrangement according to claim 6, wherein the primary hydraulic pressure power source is located on a static structure of the engine arrangement.

11. An engine arrangement according to claim 5, wherein the hydraulic actuator rotates with the first propeller assembly, and the primary hydraulic pressure power source is located on a static structure of the engine arrangement.

12. An engine arrangement according to claim 10 further having:
a gear assembly that drives the first propeller assembly, the gear assembly being driven by a power drive shaft that joins to the gear assembly at a first side thereof, the power drive shaft having a longitudinally extending internal cavity,
a static conduit which extends along the internal cavity, the conduit penetrating the gear assembly such that a portion of the conduit projects from an opposing second side of the gear assembly, the main hydraulic fluid supply lines being routed inside the static conduit, and
a first main hydraulic rotating coupling mounted to the projecting portion of the static conduit, the main hydraulic fluid supply lines extending between the primary hydraulic pressure power source and the hydraulic actuator via the first main hydraulic rotating coupling.

13. An engine arrangement according to claim 7, further having:
a gear assembly that drives the first propeller assembly, the gear assembly being driven by a power drive shaft that joins to the gear assembly at a first side thereof, the power drive shaft having a longitudinally extending internal cavity,
a static conduit which extends along the internal cavity, the conduit penetrating the gear assembly such that a portion of the conduit projects from an opposing second side of the gear assembly, the main hydraulic fluid supply lines being routed inside the static conduit, and
a first main hydraulic rotating coupling mounted to the projecting portion of the static conduit, the main hydraulic fluid supply lines extending between the primary hydraulic pressure power source and the hydraulic actuator via the first main hydraulic rotating coupling,
wherein the back-up hydraulic rotating coupling is on the first side of the gear assembly.

14. An engine arrangement according to claim 12 which is for a contra-rotating engine, the arrangement further having:
a second propeller assembly arranged to rotate in an opposite direction to the first propeller assembly, the gear assembly also driving the second propeller assembly,
a second pitch change mechanism having a hydraulic actuator which rotates with the second propeller assembly and which angularly displaces propellers of the second propeller assembly,
one or more second main hydraulic fluid supply lines for transferring hydraulic fluid between the primary hydraulic pressure power source and the hydraulic actuator of the second pitch change mechanism, the second main hydraulic fluid supply lines being routed inside the static conduit, and
a second main hydraulic rotating coupling which is mounted to the projecting portion of the static conduit, the second main hydraulic fluid supply lines extending between the primary hydraulic pressure power source and the hydraulic actuator of the second pitch change mechanism via the second main hydraulic rotating coupling.

* * * * *